United States Patent [19]
Carr

[11] Patent Number: 5,185,016
[45] Date of Patent: Feb. 9, 1993

[54] WASTE GAS SCRUBBER

[75] Inventor: William J. Carr, San Jose, Calif.

[73] Assignee: Ecoloteck, Inc., San Jose, Calif.

[21] Appl. No.: 778,466

[22] Filed: Oct. 16, 1991

[51] Int. Cl.⁵ .............................................. B01D 47/16
[52] U.S. Cl. ...................................... 55/230; 55/234; 261/92
[58] Field of Search .......................... 55/230, 232, 239; 261/92

[56] References Cited

U.S. PATENT DOCUMENTS

| | | | |
|---|---|---|---|
| 2,440,446 | 4/1948 | Kenny | 261/92 |
| 4,294,781 | 10/1981 | Holmquist | 55/230 |
| 4,762,539 | 8/1988 | Muto | 55/232 |
| 5,011,520 | 4/1991 | Carr et al. | 55/528 |

Primary Examiner—Bernard Nozick
Attorney, Agent, or Firm—Bielen, Peterson & Lampe

[57] ABSTRACT

A waste gas scrubber utilizing a liquid body within an enclosure. The enclosure forms a chamber to confine the body of liquid to a portion of the chamber. A rotatable member includes an inside and an peripheral portion and possesses a multiplicity of passages extending from the inside portion to the peripheral portion. A stator surrounds the rotatable member and forms a channel between itself and the stator. The stator includes the first opening communicating with the body of liquid, permitting liquid to pass to the peripheral portion of the rotatable member, and into the channel between the stator and the peripheral portion of the rotatable member. The stator includes a second opening to the liquid body in the chamber. Waste gases traveling through the rotatable member are purified by turbulent contact with liquid forced into the channel. The purified gases are then led from the chamber to the outside environment.

17 Claims, 4 Drawing Sheets

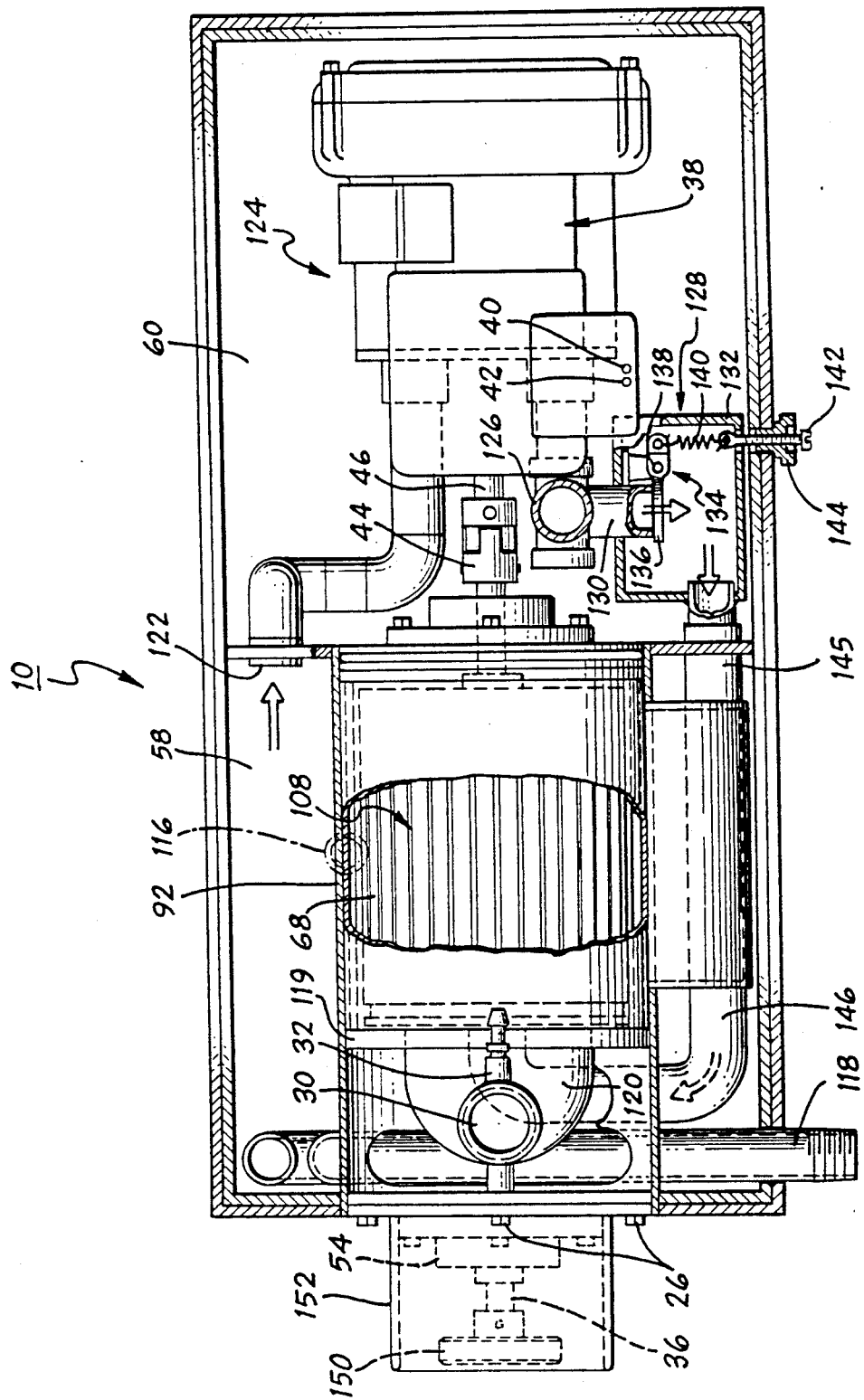

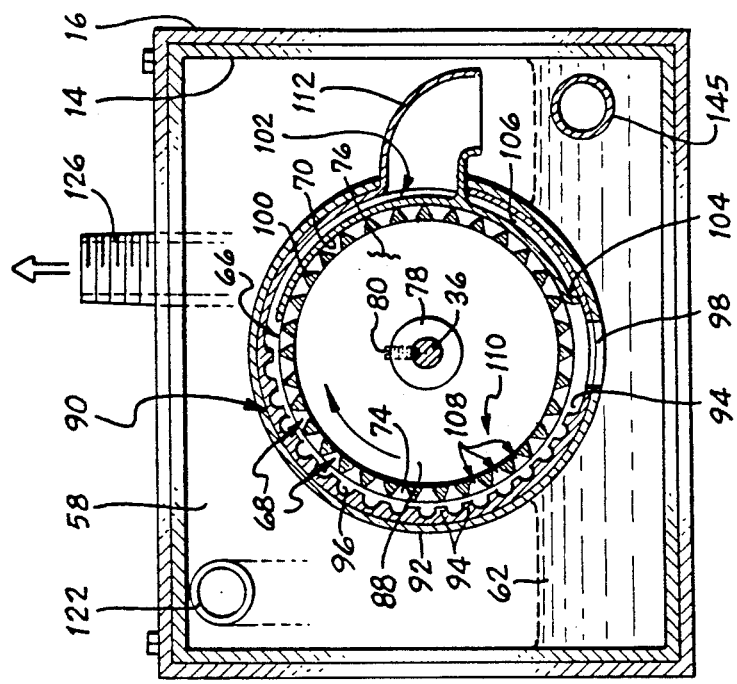
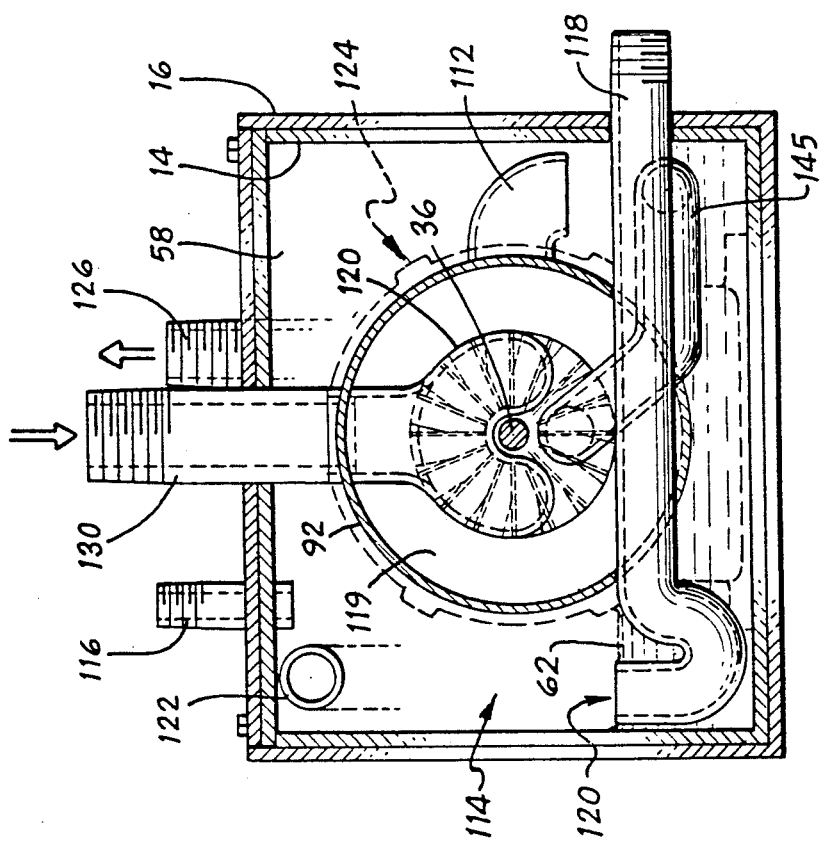

WASTE GAS SCRUBBER

BACKGROUND OF THE INVENTION

The present invention relates to a novel waste gas scrubbing apparatus.

Many industrial facilities produce toxic gases as a byproduct. This problem is especially acute in the electronics industry. For example, the semi-conductor manufacturing process requires the deposition of a layer of silicon on a silicon wafer. The photographic tracing process involves etching away the silicon from around the traced lines. Layers of conductive materials are then layered atop etched areas. Waste gases such as silane, trichlorosilane, tetraethyl orthosilicate, phosphine and the like are produced in such electronics fabrication process and must be safely disposed.

Toxic gases such as silanes, also include particulate matter which form viscid substances tending clog scrubbing machinery used in the prior art. In the past, toxic gases from the chip making manufacturing plants were diluted with water and transported to a sprinkler treatment plant. Moreover, the sprinklers employed in this scrubbing system were ineffective in capturing a high percentage of the gases. In addition, mechanical portions of the prior system were easily clogged and rendered, inoperable by the viscid substances resulting from the solid and gas admixtures heretofore described. Since failure to quickly remove noxious gases from the chip making process extends to spoil the newly manufactured chips, breakdown of a scrubbing system severely interrupts the manufacturing process. Needless to say the prior systems required extensive maintenance and consequential exposure of maintenance personnel to toxic fumes.

Reference is made to U.S. Pat. No. 5,011,520 which describes a hydrodynamic fume scrubber particularly usable in the electronics manufacturing industry. Unfortunately, the scrubber described in this patent includes a filter media which serves as a collection area for particulate matter. The filter media tends to clog and requires constant cleaning to permit the scrubber to operate.

A gas scrubbing apparatus which solves the problems encountered in the prior art would be a great advance in the field of air pollution control.

SUMMARY OF THE INVENTION

In accordance with the present invention a novel and useful waste gas scrubber is herein provided.

The scrubber of the present invention employs an enclosure forming a chamber therewithin. The chamber contains a body of liquid which is used in the scrubbing process. Thus, the chamber includes a liquid portion and a gas portion thereabove. Consequently, a liquid inlet and outlet connects to the chamber such that the liquid is constantly circulated through the chamber. In addition, a gas outlet leads from the chamber and extends to the exterior of the chamber or to a recirculation apparatus which feeds a portion of the scrubbed exhaust gas back into the chamber.

The present invention also includes a rotatable member such as a turbine which turns within the chamber. The rotatable member includes means for creating turbulent fluid flow at the periphery of the rotatable member. For example, a series of vanes or blades may be formed at the periphery of the turbine to produce this effect. Waste gas may be fed into the turbine within the chamber along the axis of the same and pass outwardly through openings to the periphery of the turbine, such that gas where turbulent flow is created by the vanes. A turbine motor or driving means may extend into the chamber by the way of a drive shaft. In addition, the invention may include means for mechanically turning the drive shaft at the outside of the chamber should the drive shaft become clogged due to residual solid material.

A stator at least partially surrounds the rotatable member within the chamber and forms a channel therebetween. The channel includes a first opening which communicates with the body of water and permits liquid to pass into contact with the rotatable member periphery for the purpose of atomization. The channel then extends about the periphery of the rotatable member and exits a second opening which generally points or directs the fluid flow back toward the body of liquid. Thus, gases flowing from the central axial region of the turbine and liquid from the liquid body mix in a turbulent fashion within the channel. In certain cases, the turbine may be positioned within the chamber to extend directly into a portion of the liquid body.

The scrubber of the present invention also includes means for delivering waste gas into the rotatable member which may take the form of a fan which is positioned adjacent the rotatable member within the chamber. The fan may be positioned on the drive shaft which also turns the turbine and is, thus, coaxial with the turbine. The fan prevents liquid from passing from the vicinity of the channel between the stator turbine to the waste gas inlet, which prevents clogging of such inlet.

It may be apparent that a novel and useful waste gas scrubber has been described.

It is therefor an object of the present invention to provide a waste gas scrubber which is compact in size and very efficient in operation for continuously scrubbing waste gases and a appurtenant solid material flowing from a manufacturing process.

It is another object of the present invention to provide a waste gas scrubber which possesses low water and power consumption characteristics.

Another object of the present invention is to provide a waste gas scrubber which greatly lessens the chance of explosions from the handling of waste gases such as hydrogen.

A further object of the present invention is to provide a waste gas scrubber which is simple to install and economical to maintain within confined spaces.

Another object of the present invention is to provide a waste gas scrubber which is not susceptible to being plugged by solid materials which normally accompany waste gases in certain processes.

A further object of the present invention is to provide a waster gas scrubber which is capable of operating at a constant inlet pressure and at variable inlet volumes.

The invention possesses other objects and advantages especially as concerns particular characteristics and features thereof which will become apparent as the specification continues.

BRIEF DESCRIPTION OF THE DRAWINGS

FIG. 2 is a horizontal sectional view taken along line 2—2 of FIG. 1.

FIG. 3 is a sectional view taken along line 3—3 of FIG. 1.

FIG. 4 is a sectional view taken along line 4—4 of FIG. 1.

Figure 1:
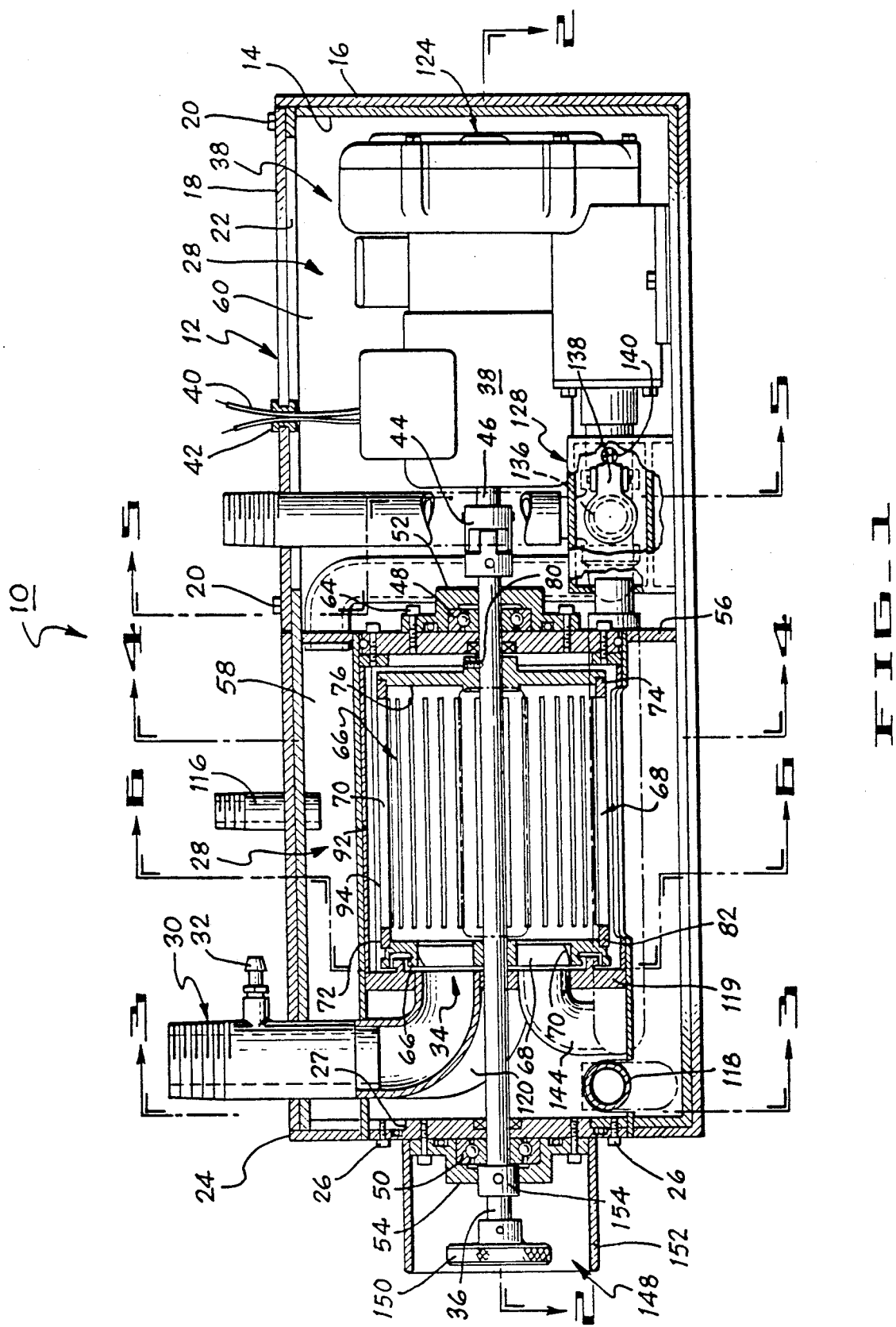
FIG. 1 is a vertical sectional view of the waste gas scrubber of the present invention.

For a better understanding of the invention reference is made to the following detail description of the preferred embodiments thereof which should be referenced to the heretofore described drawings.

DESCRIPTION OF THE PREFERRED EMBODIMENTS

Various aspects of the present invention will evolve from the following detailed description of the preferred embodiments which should be taken in conjunction with the prior described drawings.

The invention as a whole is shown in the drawings by reference character 10. The waste gas scrubber 10 includes as one of its elements a housing 12 which is shown as a metallic member having an inner wall 14 and an outer wall 16. Housing 12 is constructed to be impervious to the passage of waste gases being treated therewithin. Plate 18 is held to inner wall 14 by fasteners 20. Passage 22 permits the replacement and removal of certain mechanisms within housing 12, which will be described hereinafter. In addition, plate 24 is held to inner wall 14 by fasteners 26. An opening 27 serves the same purpose as opening 22 in the assemblage and maintenance of scrubber 10. It should be noted that although housing 12 is depicted as being metallic, other materials may be employed in this regard such as plastics, which may be visually transparent. Chamber 28 is formed by housing 12.

Figure 6:
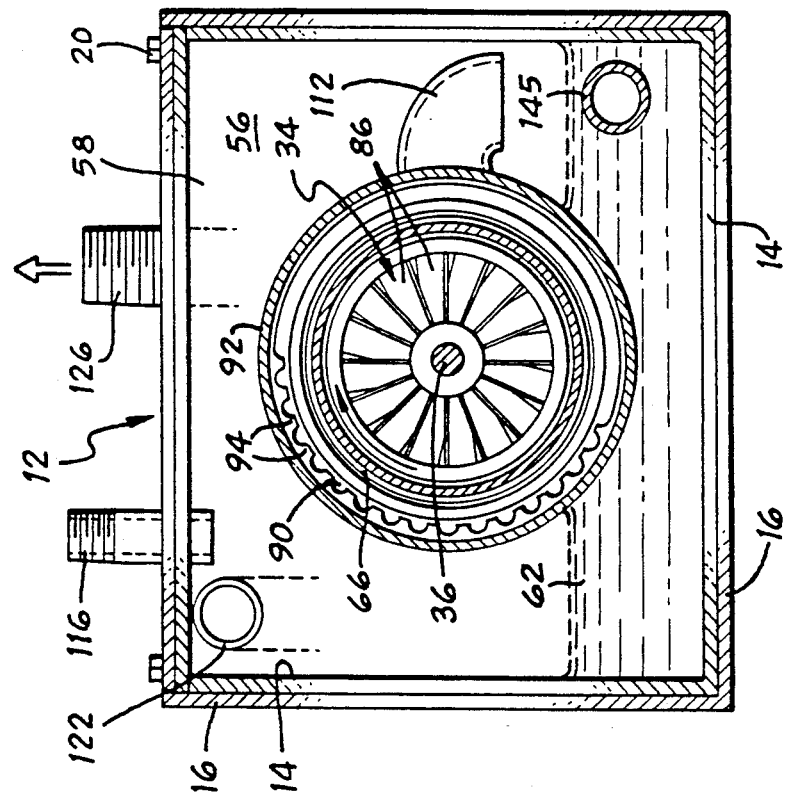
FIG. 6 is a sectional view taken along line 6—6 of FIG. 1.

Waste gas inlet 30, FIG. 1 connects to a waste gas generating apparatus (not shown). For example, waste gases entering inlet 30 may take the form of phosphine, germanium tetrachloride, hexafluoroethane, silane, tetraethyl orthosilicate and the like, generally exuding from processes in the electronic industries. In addition, a potential explosive, free hydrogen, may be passed into waste gas inlet 30 as a result of the same electronics industry processes. Port 32 permits injection of the inert gas into chamber 28 to obviate the possibility of outside air entering chamber 28 of scrubber 10 and causing an explosion. Waste gas entering inlet 30 is directed ninety degrees and is fed into a fan 34, best shown on FIGS. 1 and 6. Fan 34 is keyed to shaft 36 which is rotated by motor 38 within chamber 28. Motor 38 receives electrical current through conductors 40 which extend through housing 28 in air-tight fashion by the use of seal 42. Coupling 44 connects the output shaft 46 of motor 38 to shaft 36 with chamber 28. Bearings 48 and 50 are enclosed by caps 52 and 54 which surround shaft 36. Cap 52 is fastened to an end plate 56 by the use of fasteners 64. End plate 56 further divides chamber 28 into a first portion 58 and a second portion 60. First portion 58 includes the provision of body of liquid 62, depicted in FIGS. 3, 4, and 6. The body of liquid may be water or any other liquid which is employed in the scrubbing process.

Scrubber 10 further includes as one as its elements, a rotatable member 66, clearly shown in FIG. 4. Rotatable member 66 possesses a plurality of vanes 68 at periphery 70 thereof. Vanes 68 are depicted in FIG. 4 as being triangular in cross-sectional configuration, however, vanes 68 may take any form consistent with periphery 70 of rotatable member 66 possessing a roughened surface. Plurality of vanes 68 are held in circular fashion by a pair of rings 72 and 74. Disc member 76 utilizes a hub 78 which keys to shaft 36 by the use of set screw 80. Ring 72 fits into a notch 82 of flange 84 located at the outer edge of fan 34. Thus, fan 34 and rotatable member 66 turn together on shaft 36, each being coaxial with shaft 36 in this regard. It should be noted that fan 34 includes a multiplicity of openings 86, FIG. 6, which permits gas to enter the interior portion 88 of rotatable member 66, yet prevents any liquid of liquid body 62 from passing back through inlet conduit 30. This aspect of the invention precludes the solidification of any waste gases within inlet conduit 30 prior to passing into the interior portion 88 of rotatable member 66.

With further reference to FIGS. 1 and 4, it may be observed that rotatable member 66 lies within a cylindrical stator 90 having a metallic outer shell 92 and a plurality of ridges 94 which extend inwardly from shell 92. Rotatable member 66 and stator 90 form a channel or gap 96 which is roughly annular in configuration. Stator 90 includes a first opening 98 which lies within liquid body 62. Baffle 100 surrounds another portion of rotatable member 96 and includes a second opening 102. Lip 104 serves as a stop for channel 96 creating a dead space 106. Gases entering interior portion 88 of rotatable member 66 pass through a plurality of openings 108 between vanes 68 and, therefore, are permitted to pass into channel 96, directional arrows 110. Rotatable member 66 and fan 34 turn clockwise in FIGS. 4 and 5. Thus, the liquid 62 and gases are turbulently mixed within channel 96, exit opening 102, and follow a ninety degree turn through elbow 112, forcing the liquid gas composition back into liquid body 62.

Means 114 is also provided in the present invention for circulating liquid into and out of the chamber first portion 58, FIGS. 1, 3, and 4. Water is introduced into first portion 58 of chamber 28 through inlet 116. Stand pipe 118 serves as the outlet for liquid body 62 from chamber portion 58, FIGS. 1 and 3. It should be noted that end plate 119 prevents liquid from liquid body 62 traveling through fan 34 and into rotatable member 66. Gas inlet 30 includes a flared portion 120, FIG. 3, which extends through plate 119 in order to feed waste gas directly into fan 34 and rotatable member 66.

Turning now to FIGS. 2 and 4, it may be observed that a gas outlet 122 is found in first portion 58 of chamber 28 located at a position higher and transversely from elbow 112 associated with opening 102 of channel 96. Gas outlet 122 extends through means 124 for generating pressure on chamber portion 58. Means 124 may be a turbin fan or blower which sucks scrubbed gas from chamber portion 58 and sends the same to gas outlet 126. Means 124 may take the form of a regenative blower Model No. DR083BC9Y, manufactured by EG. & G. Rotron, Industrial Division, Saugerties, N.Y., which also provides motor 38.

Generally, gases such as oxygen, nitrogen, and some free hydrogen pass through gas outlet 126. It has been found that the free hydrogen readily quickly combines with oxygen to form water vapor, which is considered to be harmless.

Figure 5:
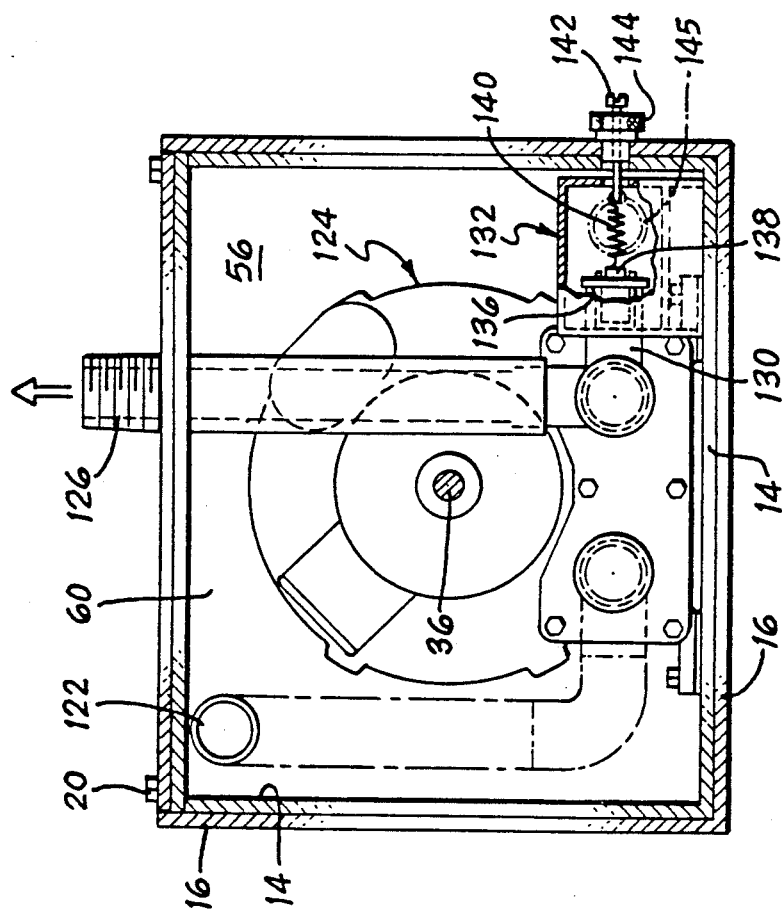
FIG. 5 is a sectional view taken alone line 5—5 of FIG. 1.

Scrubber 10 is further provided with mean 128 for recirculating a portion of the scrubbed gas exiting outlet 122, FIGS. 1, 2 and 5. Means 128 includes an offset conduit 130 which feeds into an air tight compartment 132. Flapper valve 134 includes a seat 136 which swings open and shut on pivot 138. Spring 140 attaches to seat 136 and a threaded screw 142 which adjusts the tension on spring 140 and, thus, the ability of flapper valve seat 136 to open and shut. Seal 144 maintains the air tight integrity of chamber 128. Bypass conduit 146 feeds scrubbed gas from air tight compartment 132 which passes through plate 118 and directly into fan 34 FIG. 2. Adjustment of threaded screw 142 maintains a relatively constant pressure at fan 34 with any changes in waste gas volume passing through inlet 30. It may be apparent that by pass conduit 145 passes through liquid body 62 prior to entry into chamber 28 first portion 58 via fan 34.

Means 146 is also included in the present invention for mechanically turning shaft 36, FIG. 1. Means 148 takes the form of a knob 150 found on the end of shaft 36 within compartment 152. Coupler 154 fixes knob to shaft 36, in this regard. Thus, if any clogging prevents the temporary turning of shaft 36 or output shaft 46 of motor 38, knob 50 may be turned to loosen such clogging and initiate the normal operation of motor 38.

In operation, waste gases are fed into inlet 30 with or without inert gases being injected through port 32. Importantly outside atmospheric gases do not enter the workings of scrubber 10 within compartment 28. Gases passing through inlet port 30 make a ninety degree turn and pass through the multiplicity of openings 86 of fan 34 and into the interior portion 88 of rotatable member 66. Fan 34 and rotatable member 66 turn on shaft 36 which is motivated by motor 38. Gases are then forced to the periphery 70 of rotatable member 66 and into channel 96 between periphery 70 of rotatable member 66 and stator 90, directional arrows 110. Fan 34 prevents moisture from passing from channel 96 back toward inlet 30 and by-pass conduit 145. This moisture barrier prevents gases entering scrubber 10 through inlet 30 from solidifying within inlet 30 upon contact with a liquid. Thus, the plugging of inlet 30 is prevented. Rotatable member 66 and fan 34 rotate at a very high rate. Thus, inlet gas is subjected to a very high turbulence at the periphery 70 of rotatable member 66 within channel 96. The plurality of vanes 68 on the periphery 70 of the rotatable member 66 and ridges 94 of stator 90 create such turbulence. Simultaneously, rotatable member 66 lies in the vicinity of liquid body 62, which causes rotatable member 66 to move liquid into channel 96. The combination of turbulent gases and forced liquid creates a fine fog of atomized liquid, such as water, which scrubs the waste gases. The waste gases travel around rotatable member 66 and are directed by baffle 100 through outlet 102 of channel 96. Elbow 112 directs the gases back into liquid body 62. At this point releasable gases, such as oxygen, hydrogen, and nitrogen start to separate from the liquid body 62 and pass through air outlet 122. The scrubbed gases and solids within liquid body 62 are circulated by means 114 through liquid outlet 118 for disposal. Purified gases exiting outlet 122 travel through means 124 for generating a negative pressure on first portion 58 of chamber 28 and are either passed to gas outlet stack 126 or recirculated by means 128 into fan 34. The amount of gas recirculated through means 128 is determined by adjusting flapper valve 134 through the use of threaded screw 142. Means 146 may be employed to mechanically turn shaft 36, holding fan 34 and rotatable member 66. In such a case, knob 150 is rotated to free shaft or output shaft 46 of motor 38 if any clogging occurs thereat.

While in foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A waste gas scrubber utilizing a liquid body comprising:
    a. an enclosure forming a chamber therewithin, said chamber containing the body of liquid; said chamber including a waste gas inlet,
    b. a rotatable member rotating within said chamber, said rotatable member including means for creating turbulent gas flow about the periphery of said rotatable member,
    c. a stator at least partially surrounding said rotatable member and forming a channel therebetween, said stator channel including a first opening communicating with the body of liquid, said channel first opening further permitting liquid to pass into contact with said periphery of said rotatable member at said channel between said stator and said rotatable member, said channel further including a second opening to said chamber; and
    d. means for delivering the waste gas to said means for creating gas flow about the rotatable member within said channel for contact with said liquid and for forming a liquid and gas fluid thereat,
    e. a gas outlet from said chamber, said outlet receiving gas exiting said channel through said second opening.

2. The waste gas scrubber of claim 1 which additionally comprises means for circulating liquid forming the liquid body into and out of said chamber.

3. The waste gas scrubber of claim 1 in which said means for delivering waste gas to said rotatable member includes a fan positioned adjacent said rotatable member.

4. The waste gas scrubber of claim 3 in which said rotatable member further includes a motor and an output shaft therefrom, said fan being liked to said output shaft of said rotatable member for rotation therewith.

5. The waste gas scrubber of claim 4 which additionally comprises means for mechanically turning said output shaft, said mechanical turning means including an extension of said shaft.

6. The waste gas scrubber of claim 1 in which said rotatable member includes an inner portion and a plurality of apertures permitting passage of gas from said inner portion to the periphery of said rotatable member.

7. The waste gas scrubber of claim 6 which additionally comprises means for recirculating a portion of gas exiting said chamber outlet to said chamber inlet.

8. The waste gas scrubber of claim 7 in which said channel second opening includes a nozzle capable directing liquid and gas fluid from said channel to the liquid body in said chamber.

9. The waste gas scrubber of claim 7 in which said means for recirculating a portion of gas exiting said chamber outlet includes a spring loaded valve and conduct means for directing gas to said rotatable member.

10. The waste gas scrubber of claim 9 in which said spring loaded valve includes a spring and means for adjusting the tension on said spring.

11. The waste gas scrubber of claim 1 in which said rotatable member directly contacts the liquid body in said chamber.

12. The waste gas scrubber of claim 11 in which said periphery of said rotatable member includes a plurality of vanes extending outwardly therefrom.

13. The waste gas scrubber of claim 1 which additionally includes means for generating a negative pressure on said gas outlet from said chamber.

14. The waste gas scrubber of claim 13 in which said means for delivering waste gas to said rotatable member includes a fan positioned adjacent said rotatable member.

15. The waste gas scrubber of claim 14 in which said rotatable member includes an inner portion and a plurality of apertures permitting passage of gas from said inner portion to the periphery of said rotatable member.

16. The waste gas scrubber of claim 15 which additionally comprises means for recirculating a portion of gas exiting said chamber outlet to said chamber inlet.

17. The waste gas scrubber of claim 16 which additionally comprises means for circulating liquid forming the liquid body into and out of said chamber.

* * * * *